July 5, 1932. T. T. GRAY 1,865,467
PROCESS OF REFINING HYDROCARBONS
Filed March 6, 1929
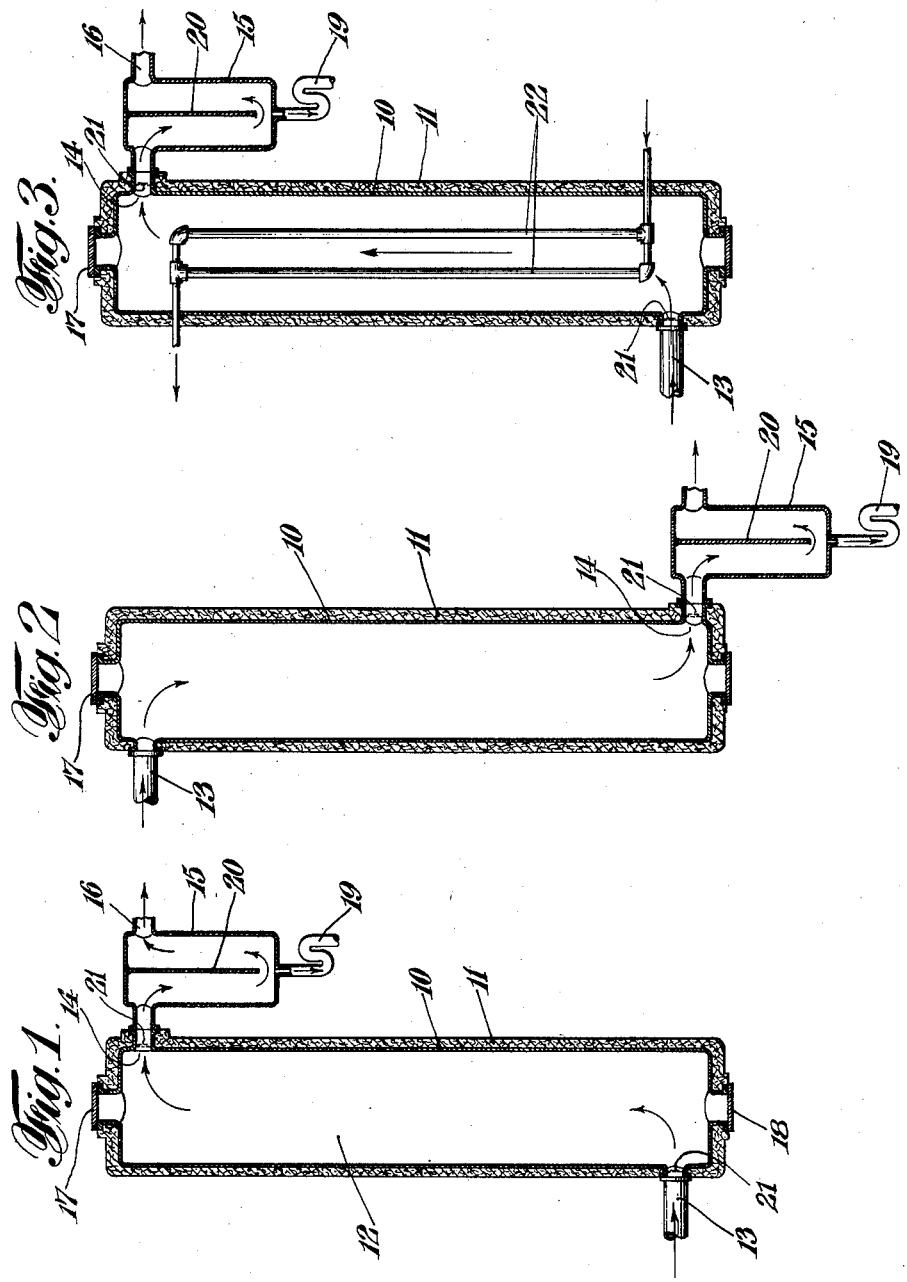
INVENTOR
Thomas T. Gray
BY
Kenyon & Kenyon
ATTORNEY Patented July 5, 1932

1,865,467

UNITED STATES PATENT OFFICE

THOMAS T. GRAY, OF ELIZABETH, NEW JERSEY, ASSIGNOR TO THE GRAY PROCESSES CORPORATION, OF NEWARK, NEW JERSEY, A CORPORATION OF DELAWARE

PROCESS OF REFINING HYDROCARBONS

Application filed March 6, 1929. Serial No. 344,620.

This invention relates to a process of refining hydrocarbons and more especially to a process of obtaining refined gasoline or other hydrocarbon fraction having a definite boiling range from cracked hydrocarbons.

Cracked hydrocarbons contain unstable, unsaturated compounds which tend to discolor on exposure to light and form gummy deposits and which, unless removed, render gasoline obtained from cracked distillate unsatisfactory as a motor fuel. In my Patent No. 1,340,889 there is disclosed a process of refining cracked hydrocarbons which consists in passing the same in vapor phase through a bed of solid adsorptive material, thereby converting the unstable, unsaturated compounds into polymers of higher boiling point than the vapors being refined. The polymers, because of their higher boiling point liquefy in the adsorptive material and the refined vapor passes through the adsorptive material after which it is collected and condensed.

An object of my present invention is an improved process of refining cracked hydrocarbons or a fraction thereof by contact in vapor phase with solid adsorptive catalytic material to obtain a refined product suitable for use as motor fuel, wherein efficient contact is obtained between the adsorptive material and succeeding portions of vapor by continuous removal of polymers which tend by their presence in the bed of adsorptive material to render the latter ineffectual. In co-pending applications various other means of accomplishing this, which need not be disscused here are disclosed and claimed. I have found that a very efficient method of prolonging the effective life of the catalyst is to remove the polymers by their entrainment in a rapidly moving vapor stream. Ordinarily the rapidly moving vapor stream will be sufficient to keep the treating material clear, but it may be advisable in some cases, to add liquids capable of dissolving the polymers in order to facilitate their removal from the surface of the adsorptive particles, but the step to which this invention is addressed is the removal of polymers, with or without other liquids from the adsorptive bed by entrainment in the vapor stream.

According to this invention, a hydrocarbon fraction obtained from cracked hydrocarbons is caused to flow in vapor phase through a bed of fuller's earth or other solid adsorptive catalytic material to effect polymerization of the undesirable constituents of the fraction. The vapor is caused to pass through the adsorptive material at sufficiently high velocity that the vapor itself is effective to carry out from the adsorptive material the polymers formed therein. The treated vapor and polymers are together removed from the bed of adsorptive material, the polymers being suspended or entrained in the vapor. The vapor and entrained polymers are passed through suitable devices for effecting separation of the polymers and vapors which are then separately collected. The vapor may be passed either upwardly or downwardly through the bed of adsorptive material and in either event, the polymers will be continuously removed from the bed of treating material, thereby permitting efficient contact between such adsorptive material and succeeding portions of vapor.

Other objects, novel features and advantages of this invention will be apparent from the following specification and accompanying drawing, wherein:

Fig. 1 is a vertical section through one form of apparatus suitable for carrying out the process.

Fig. 2 is a vertical section through a modified form of apparatus, and

Fig. 3 is a vertical section through a further modified form of apparatus.

The treating tower 10 is provided with a covering 11 of heat insulating material. The tower 10 is of relatively small diameter in comparison with its height and is filled with a charge 12 of solid adsorptive catalytic material, such, for example, as fuller's earth. A pipe 13 is provided for supplying vapor to be treated to the tower and an outlet pipe 14 leads to a separator 15 from which a pipe 16 leads to a suitable condenser (not shown). The tower is provided with a charging manhole 17 and a discharging manhole 18 and the separator 15 is provided with a trapped drain pipe 19. The separator 15 comprises a chamber having a central baffle 20 and is effective to separate entrained liquid from vapor. In place of the separator shown, any other type of apparatus may be used which is capable of separating the entrained liquids from the vapor. When desired a part of the vapor may be coindensed in the separator to assist in its action.

In Figs. 1 and 3, screens 21 are provided at the inlet and outlet of the tower 10, these screens being pervious to fluid, but impervious to solids. In Fig. 2, only the outlet is provided with a screen 21. To accelerate the flow of polymers, heat may be applied as shown in Fig. 3 by means of the pipes 32.

Cracked hydrocarbon in vapor phase which have been fractionated or otherwise treated to remove the high boiling constituents and obtain a definite fraction, such, for example, as gasoline, is introduced into the tower 10 through the pipe 13 and is caused to flow through the bed 12 of solid adsorptive catalytic material. The unstable, unsaturated compounds present in the fraction are polymerized by contact with the adsorptive material, and as these polymers are of higher boiling point than the vapor being treated they are condensed in the bed of adsorptive material. Vapor to be treated is introduced into the tower under pressure and as the tower is of relatively small diameter in comparison with its height, the vapor flows through the treating material at high velocity. The relationship of the pressure and the dimensions of the tower is such that the velocity of the vapor stream is sufficient to carry polymers out of the bed of treating material through the outlet 14 to the separator 15. Preferably the velocity of the vapor stream, especially when downwardly directed is sufficiently high that it removes the polymers substantially as fast as they are produced in the treating material. The polymers are entrained in the vapor and are separated from the vapor stream in the separator 15, the polymers being drained off through the pipe 19 and the vapor passing out through the pipe 16 to a condenser (not shown). The vapor to be treated may be passed either upwardly or downwardly through the bed of adsorptive material. In case the vapor is passed downwardly through the treating material, the vapor stream will assist the natural drainage, but in the event that the vapor stream passes upwardly, the vapor stream has to be of sufficient velocity to carry the polymers upwardly. In either event, however, the polymers are continuously removed from the adsorptive material by the vapor stream, thereby permitting efficient contact between the adsorptive material and succeeding portions of vapor.

In those cases where it is advisable to dilute or dissolve the polymers in order to facilitate their removal from the surface of the fuller's earth or other catalytic material, the diluent or solvent may be introduced by means disclosed in my co-pending application, Serial No. 17,855. In such cases the remarks made in the above paragraph concerning the entrainment of the polymers apply to the entrainment of their solution. I do not claim herein the steps of polymerizing the unstable, unsaturated constituents of the vapors nor the dilution of polymers with liquid capable of dissolving them, but in the appended claims the term "polymers" includes both the polymers themselves and their solution in a suitable liquid.

I claim:

1. In the process of refining cracked hydrocarbons which consists in passing the hydrocarbons in vapor phase through a bed of solid adsorptive material thereby polymerizing unstable, unsaturated constituents present in the hydrocarbons, the improvement comprising maintaining the vapor flow at sufficient velocity to carry polymers out of the bed of adsorptive material substantially as fast as they are produced.

2. In the process of refining hydrocarbons which comprises passing the same in vapor phase through a bed of solid adsorptive material thereby polymerizing the unstable, unsaturated constituents of such hydrocarbons, the steps of maintaining the flow of the vaporized hydrocarbons at sufficient velocity to cause removal of the polymers from the bed by the treated vapor substantially as fast as they are produced and subsequently separating the treated vapor and polymers.

3. In the process of refining hydrocarbons which comprises passing the same in vapor phase upwardly through a bed of solid adsorptive material, the steps of maintaining the flow of the vapors through the adsorptive material at a velocity sufficient to cause by entrainment in the treated vapor removal from the adsorptive material of polymers formed therein substantially as fast as they are produced and subsequently separating the polymers and treated vapor.

4. The process of obtaining refined motor fuel from cracked hydrocarbons which comprises continuously passing a fraction thereof in vapor phase through a bed of solid adsorptive material thereby polymerizing unstable, unsaturated compounds present in said fraction, maintaining the vapor stream at sufficiently high velocity to cause continuous removal of polymers from the adsorptive material by the vapor stream substantially as fast as they are produced and subsequently separating the treated vapor and polymers.

5. The process of obtaining refined motor fuel from cracked hydrocarbons which comprises continuously passing a fraction thereof in vapor phase upwardly through a bed of solid adsorptive material thereby polymerizing unstable, unsaturated compounds present in said fraction, maintaining the vapor stream at sufficiently high velocity to cause continuous upward removal of polymers from the bed by entrainment in the vapor stream and subsequently separating the treated vapor and polymers.

6. The process of refining cracked hydrocarbons which consists in passing a stream of the same in vapor phase upwardly through a bed of solid adsorptive material thereby polymerizing unstable unsaturated constituents present in the hydrocarbons, maintaining the velocity of the vapor stream at sufficiently high velocity to cause continuous upward removal of polymers from the bed by entrainment in the vapor stream and subsequently separating the treated vapor and polymers.

In testimony whereof, I have signed my name to this specification.

THOMAS T. GRAY.